United States Patent
Onishi et al.

(10) Patent No.: US 11,733,201 B2
(45) Date of Patent: Aug. 22, 2023

(54) GAS SENSOR

(71) Applicant: NGK INSULATORS, LTD., Aichi (JP)

(72) Inventors: Ryo Onishi, Iwakura (JP); Yasuhide Kojima, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/524,878

(22) Filed: Nov. 12, 2021

(65) Prior Publication Data

US 2022/0074884 A1 Mar. 10, 2022

Related U.S. Application Data

(62) Division of application No. 16/595,797, filed on Oct. 8, 2019, now abandoned.

(30) Foreign Application Priority Data

Oct. 10, 2018 (JP) ................... 2018-192038

(51) Int. Cl.
  *G01N 27/406* (2006.01)
  *G01N 27/407* (2006.01)

(52) U.S. Cl.
  CPC ....... *G01N 27/4067* (2013.01); *G01N 27/407* (2013.01); *G01N 27/4071* (2013.01)

(58) Field of Classification Search
  CPC ........... G01N 27/4067; G01N 27/4071; G01N 27/4072
  See application file for complete search history.

(56) References Cited

U.S. PATENT DOCUMENTS

| 6,055,972 A | 5/2000 | Fujimoto |
| 6,304,813 B1 | 10/2001 | Ikeda |
| 2002/0043460 A1* | 4/2002 | Ikeda ................ G01N 27/4067 204/424 |
| 2006/0042965 A1* | 3/2006 | Sasaki ................ G01N 33/005 204/426 |
| 2007/0158333 A1 | 7/2007 | Kosaka |
| 2011/0186431 A1 | 8/2011 | Horisaka |

(Continued)

FOREIGN PATENT DOCUMENTS

| JP | 2003-149201 A | 5/2003 |
| JP | 2012-210637 A | 11/2012 |
| JP | 2016-109685 A | 6/2016 |

OTHER PUBLICATIONS

Japanese Office Action received in corresponding Japanese Application No. 2018-192038 dated May 17, 2022.

*Primary Examiner* — Joshua L Allen
(74) *Attorney, Agent, or Firm* — Mattingly & Malur, PC

(57) ABSTRACT

A gas sensor includes a solid electrolyte body with oxygen ion conductivity, a gas flow portion (ranging from a gas inlet port to a second inner cavity), a particular gas detector (including a main pump cell, a measurement pump cell, an auxiliary pump cell, etc.), and a control device. Prior to startup of the gas sensor, the control device sets electric power supplied to a heater such that a temperature difference between a temperature of the heater and a preset target temperature becomes zero, and determines, on the basis of the set electric power, whether temperature raising control of supplying the set electric power to the heater is to be executed.

6 Claims, 7 Drawing Sheets

(56) References Cited

U.S. PATENT DOCUMENTS

| | | |
|---|---|---|
| 2012/0248071 A1 | 10/2012 | Ikoma |
| 2012/0273369 A1 | 11/2012 | Kato |
| 2015/0076134 A1* | 3/2015 | Surnilla ............ G01N 27/4077 |
| | | 219/221 |
| 2016/0011159 A1 | 1/2016 | Sekiya |
| 2016/0123262 A1 | 5/2016 | Matsuoka |
| 2016/0139073 A1 | 5/2016 | McQuillen |
| 2016/0161445 A1* | 6/2016 | Sakakibara ........ G01N 27/4077 |
| | | 204/424 |
| 2017/0292433 A1 | 10/2017 | Hayash |
| 2017/0315080 A1 | 11/2017 | Aoki |
| 2017/0356378 A1 | 12/2017 | Hayash |
| 2020/0116665 A1 | 4/2020 | Onishi et al. |

* cited by examiner

GAS SENSOR

CROSS-REFERENCE TO RELATED APPLICATION

The present application claims priority of Japanese Patent Application No. 2018-192038 filed on Oct. 10, 2018, the entire contents of which are incorporated herein by reference.

BACKGROUND OF THE INVENTION

1. Field of the Invention

The present invention relates to a gas sensor.

2. Description of the Related Art

There has hitherto been known a gas sensor including a sensor element that detects concentrations of predetermined gases, such as NOx and oxygen, contained in measurement object gas, for example, automobile exhaust gas (see Patent Literature (PTL) 1). Recently, the necessity of starting up the above-mentioned gas sensor as early as possible has increased with tighter regulations on the exhaust gas.

CITATION LIST

Patent Literature

PTL 1: Japanese Unexamined Patent Application Publication No. 2016-109685

SUMMARY OF THE INVENTION

In trying to start up the gas sensor at an earlier timing, the gas sensor is first heated to an operating temperature. However, if condensate water is present in a piping, cracking may occur in the gas sensor during a temperature rise due to an influence of the condensate water. In consideration of the above point, the temperature rise of the gas sensor is started after waiting for the condensate water in the piping to disappear. In other words, the temperature rise of the gas sensor is not started until the condensate water in the piping disappears. For that reason, if the condensate water is present in the piping, the gas sensor cannot be started up at early timing.

The present invention has been made with intent to solve the above-mentioned problem, and a main object of the present invention is to heat a gas sensor to an operating temperature in a shorter time.

A gas sensor of the present invention includes:
a solid electrolyte body with oxygen ion conductivity;
a resistance heating element embedded in the solid electrolyte body;
a gas flow portion provided inside the solid electrolyte body;
a particular gas detector detecting particular gas in measurement object gas introduced to the gas flow portion; and
a controller setting, prior to startup of the gas sensor, electric power supplied to the resistance heating element such that a temperature of the resistance heating element becomes equal to a preset target temperature, and determining, on basis of the set electric power, whether temperature raising control of supplying the set electric power to the resistance heating element is to be executed.

According to the gas sensor described above, prior to the startup of the gas sensor, the electric power supplied to the resistance heating element is set such that the temperature of the resistance heating element becomes equal to the preset target temperature, and whether the temperature raising control of supplying the set electric power to the resistance heating element is to be executed is determined on the basis of the set electric power. Prior to the startup of the gas sensor, greater electric power needs to be supplied to the resistance heating element as a water spraying amount in the gas sensor increases. Furthermore, a phenomenon of causing the cracking in the gas sensor depends on the electric power supplied to the resistance heating element. Thus, by determining, on the basis of the set electric power prior to actually starting the supply of the set electric power to the resistance heating element, whether the temperature raising control is to be executed, the gas sensor can be heated to the operating temperature in a shorter time while ensuring that cracking does not occur in the gas sensor.

In the gas sensor of the present invention, the controller may determine whether the set electric power exceeds a threshold corresponding to a water spraying amount at which cracking occurs in the gas sensor, and may execute the temperature raising control if a result of the determination as for whether the set electric power exceeds the threshold is NO. Under the condition that the set electric power does not exceed the threshold, a possibility of the occurrence of cracking in the gas sensor is small. Accordingly, if the determination result is NO, the temperature raising control is executed. As a result, the gas sensor can be heated to the operating temperature in a shorter time while ensuring that cracking does not occur in the gas sensor.

In the gas sensor of the present invention, the controller may supply the electric power to the resistance heating element within a range not exceeding the threshold if the result of the determination as for whether the set electric power exceeds the threshold is YES (for example, the controller may control the electric power supplied to the resistance heating element such that the temperature of the resistance heating element becomes equal to a predetermined temperature (i.e., a predetermined lower temperature) lower than the target temperature). If the set electric power exceeds the predetermined threshold, there is a possibility that cracking may occur in the gas sensor because the water spraying amount in the gas sensor is too high. Accordingly, the electric power is supplied to the resistance heating element in the range not exceeding the threshold. As a result, the gas sensor can be heated to the operating temperature in a shorter time than the case of stopping the supply of the electric power to the resistance heating element when the set electric power exceeds the threshold.

In the above case, at predetermined timing after starting the supply of the electric power to the resistance heating element within the range not exceeding the threshold, the controller may set again the electric power supplied to the resistance heating element such that the temperature of the resistance heating element becomes equal to the target temperature, and may determine, on the basis of the set electric power, whether the temperature raising control of supplying the set electric power to the resistance heating element is to be executed. With that feature, the temperature raising control can be restarted in a timely fashion, and a time to reach the operating temperature can be further shortened. The predetermined timing may be after the lapse of a predetermined time or after the temperature of the resistance heating element has reached the predetermined lower temperature.

The gas sensor of the present invention may further include a porous protective film covering at least portions of the solid electrolyte body, the portions corresponding to an externally-exposed electrode of the particular gas detector and an inlet of the gas flow portion. With that feature, because of the presence of the porous protective film, cracking is harder to occur even when the water spraying amount is relatively high. Accordingly, for example, the above-described threshold can be set to a relatively high value.

DETAILED DESCRIPTION OF THE INVENTION

Figure 1:
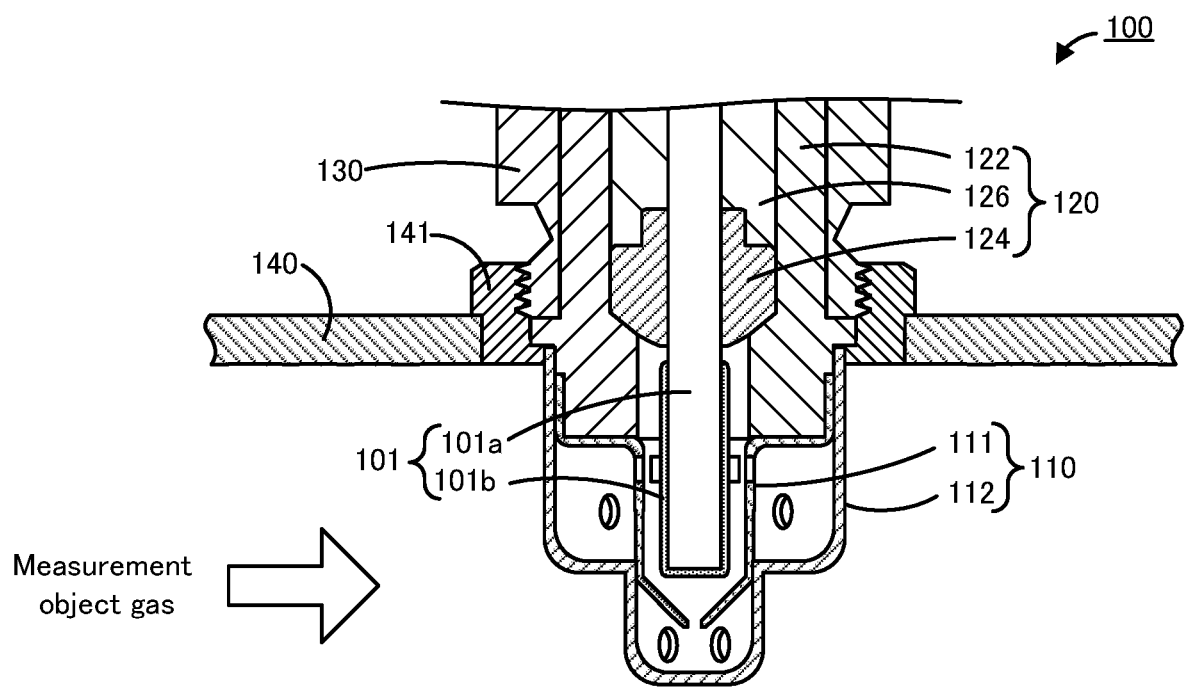
FIG. 1 is a vertical sectional view of a gas sensor 100.
Figure 2:
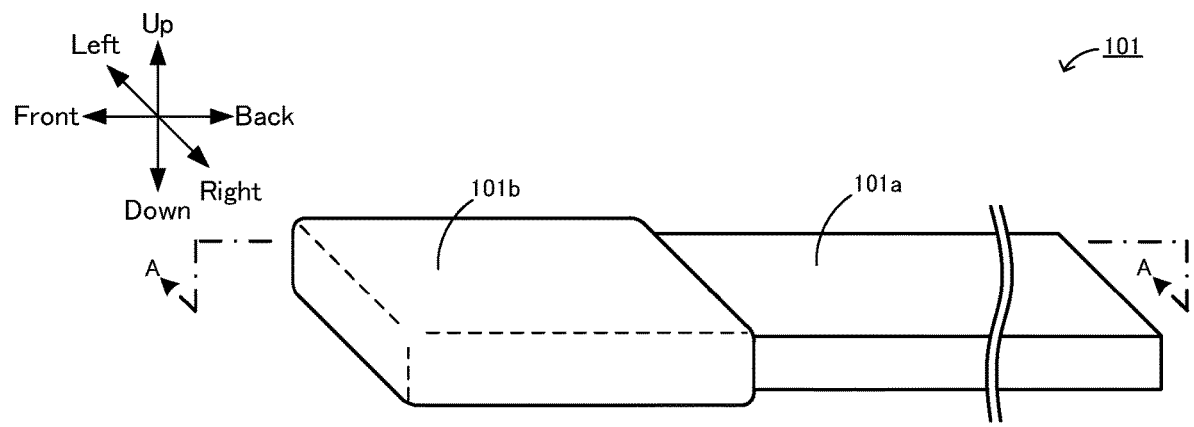
FIG. 2 is a schematic perspective view illustrating an example of configuration of a sensor element 101.
Figure 3:
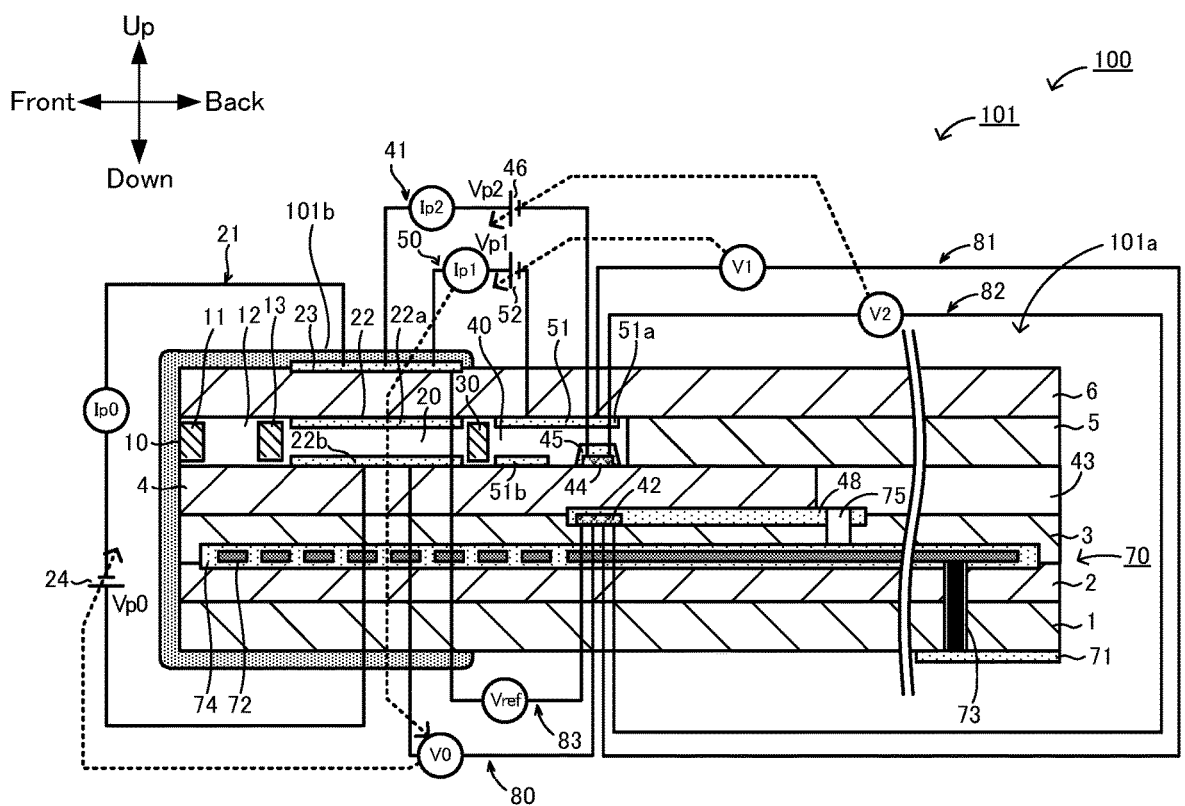
FIG. 3 is a sectional view taken along A-A in FIG. 2.
Figure 4:
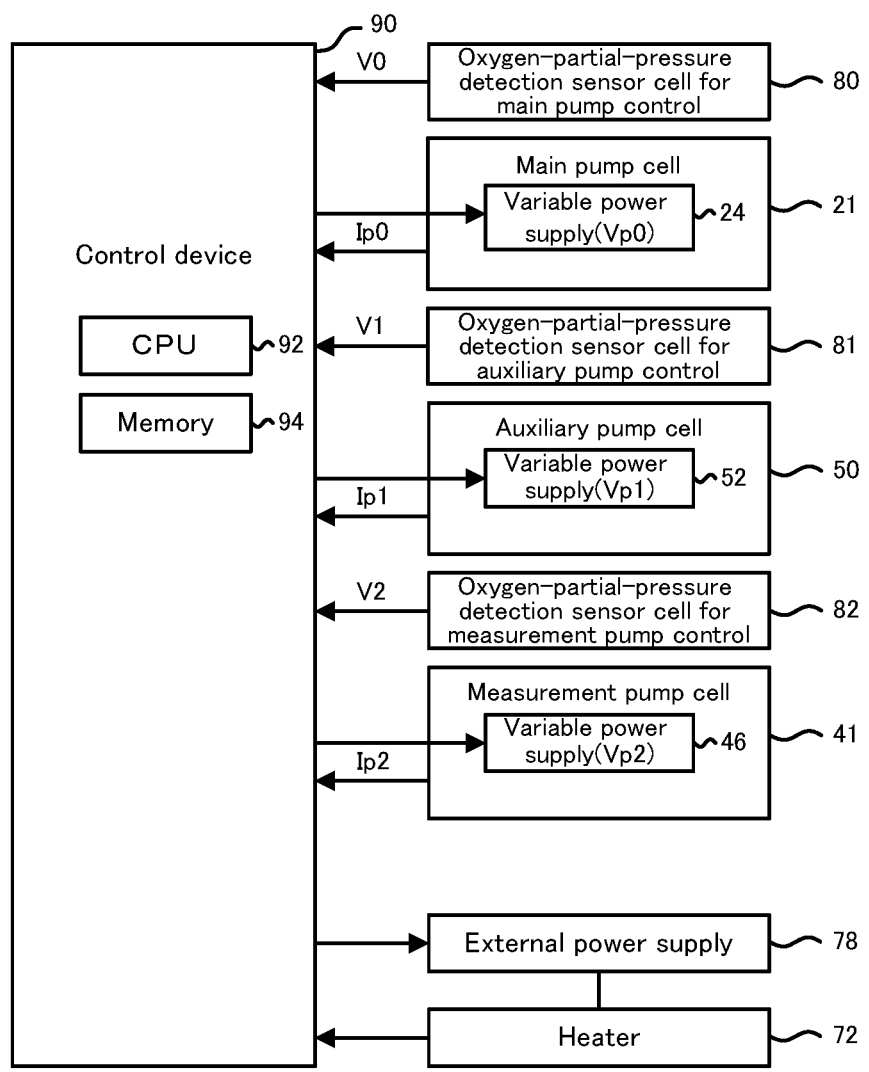
FIG. 4 is a block diagram illustrating an example of a control device 90.

An embodiment of the present invention will be described below with reference to the drawings. FIG. 1 is a vertical sectional view of a gas sensor 100 according to an embodiment of the present invention. FIG. 2 is a schematic perspective view illustrating an example of configuration of a sensor element 101. FIG. 3 is a sectional view taken along A-A in FIG. 2. FIG. 4 is a block diagram illustrating an example of a control device 90. A structure of the gas sensor 100, illustrated in FIG. 1, is known and disclosed in, for example, Japanese Unexamined Patent Application Publication No. 2012-210637.

The gas sensor 100 includes the sensor element 101, a protective cover 110 covering one end (lower end in FIG. 1) of the sensor element 101 in a longitudinal direction and protecting the sensor element 101, an element sealing body 120 fixedly holding the sensor element 101 in a sealed state, and a nut 130 attached to the element sealing body 120. The gas sensor 100 is attached, for example, as illustrated, to a piping 140 such as a vehicular exhaust gas pipe, and is used to measure a concentration of particular gas (NOx in this embodiment) contained in exhaust gas that is measurement object gas. The sensor element 101 includes a sensor element body 101a and a porous protective film 101b covering the sensor element body 101a. The sensor element body 101a implies a portion of the sensor element 101 except for the porous protective film 101b.

The protective cover 110 includes an inner protective cover 111 having a bottom-equipped tubular shape and covering one end of the sensor element 101, and an outer protective cover 112 having a bottom-equipped tubular shape and covering the inner protective cover 111. A plurality of holes for allowing the measurement object gas to flow into the protective cover 110 is formed in the inner protective cover 111 and the outer protective cover 112. The one end of the sensor element 101 is positioned in a space that is surrounded by the inner protective cover 111.

The element sealing body 120 includes a cylindrical main metal fitting 122, a ceramic-made supporter 124 enclosed in a through-hole inside the main metal fitting 122, and a powder compact 126 that is obtained by molding powder of ceramic such as talc, and that is enclosed in the through-hole inside the main metal fitting 122. The sensor element 101 is positioned to lie on a center axis of the element sealing body 120 and to penetrate through the element sealing body 120 in a front-back direction. The powder compact 126 is compressed between the main metal fitting 122 and the sensor element 101. Thus, the powder compact 126 not only seals the through-hole inside the main metal fitting 122, but also fixedly holds the sensor element 101.

The nut 130 is fixed coaxially with the main metal fitting 122 and includes a male thread portion formed on an outer peripheral surface. The male thread portion of the nut 130 is inserted in an attachment member 141 that is welded to the piping 140 and that includes a female thread portion formed in its inner peripheral surface. Thus, the gas sensor 100 can be fixed to the piping 140 in a state in which a portion of the sensor element 101 including the one end thereof and the protective cover 110 are projected into the piping 140.

The sensor element 101 has an elongate rectangular parallelepiped shape as illustrated in FIGS. 2 and 3. The sensor element 101 is described in more detail below. For convenience of explanation, the longitudinal direction of the sensor element 101 is called a front-back direction, the thickness direction of the sensor element 101 is called an up-down direction, and the width direction of the sensor element 101 is called a left-right direction.

As illustrated in FIG. 3, the sensor element 101 is an element having a structure in which six layers, namely a first substrate layer 1, a second substrate layer 2, a third substrate layer 3, a first solid electrolyte layer 4, a spacer layer 5, and a second solid electrolyte layer 6, each layer being made of a solid electrolyte with oxygen ion conductivity, such as zirconia ($ZrO_2$), are successively laminated in the mentioned order from the lower side as viewed on the drawing. In addition, the solid electrolyte forming those six layers is so dense as to be air-tight. The sensor element 101 having the above structure is manufactured, for example, by performing predetermined treatments and printing of circuit patterns on ceramic green sheets corresponding to the individual layers, laminating those ceramic green sheets, and then firing them into an integral body.

In one end portion (end portion in the forward direction) of the sensor element 101, a gas inlet port 10, a first diffusion rate controlling portion 11, a buffer space 12, a second diffusion rate controlling portion 13, a first inner cavity 20, a third diffusion rate controlling portion 30, and a second inner cavity 40 are successively adjacently formed in the mentioned order in communication with each other between a lower surface of the second solid electrolyte layer 6 and an upper surface of the first solid electrolyte layer 4.

The gas inlet port 10, the buffer space 12, the first inner cavity 20, and the second inner cavity 40 are each constituted as an inner space of the sensor element 101, which is formed by hollowing out the spacer layer 5, and which is defined at a top by the lower surface of the second solid electrolyte layer 6, at a bottom by the upper surface of the first solid electrolyte layer 4, and at a side by a side surface of the spacer layer 5.

The first diffusion rate controlling portion 11, the second diffusion rate controlling portion 13, and the third diffusion rate controlling portion 30 are each provided as a pair of two horizontally elongate slits (each given by an opening having the longitudinal direction in a direction perpendicular to the drawing sheet). A portion ranging from the gas inlet port 10 to the second inner cavity 40 is also called a gas flow portion.

At a position farther away from the front end side than the gas flow portion, a reference gas inlet space 43 is formed in a region between an upper surface of the third substrate layer 3 and a lower surface of the spacer layer 5 with a side of the reference gas inlet space 43 being defined by a side surface of the first solid electrolyte layer 4. For example, the atmosphere is introduced as reference gas to the reference gas inlet space 43 when the NOx concentration is measured.

An atmosphere inlet layer 48 is a layer made of porous ceramic, and the reference gas is introduced to the atmosphere inlet layer 48 through the reference gas inlet space 43. The atmosphere inlet layer 48 is formed so as to cover a reference electrode 42.

The reference electrode 42 is formed in a state sandwiched between the upper surface of the third substrate layer 3 and the first solid electrolyte layer 4, and the atmosphere inlet layer 48 in communication with the reference gas inlet space 43 is disposed around the reference electrode 42 as described above. Furthermore, as described later, an oxygen concentration (oxygen partial pressure) in each of the first inner cavity 20 and the second inner cavity 40 can be measured using the reference electrode 42.

In the gas flow portion, the gas inlet port 10 is opened to an external space such that the measurement object gas is taken into the sensor element 101 from the external space through the gas inlet port 10. The first diffusion rate controlling portion 11 applies predetermined diffusion resistance to the measurement object gas having been taken in through the gas inlet port 10. The buffer space 12 is a space for introducing the measurement object gas, which has been introduced from the first diffusion rate controlling portion 11, to the second diffusion rate controlling portion 13. The second diffusion rate controlling portion 13 applies predetermined diffusion resistance to the measurement object gas introduced to the first inner cavity 20 from the buffer space 12. When the measurement object gas is introduced up to the first inner cavity 20 from the outside of the sensor element 101, the measurement object gas having been abruptly taken into the sensor element 101 through the gas inlet port 10 due to pressure fluctuations of the measurement object gas in the external space (i.e., due to pulsations of exhaust pressure when the measurement object gas is automobile exhaust gas) is not directly introduced to the first inner cavity 20, but it is introduced to the first inner cavity 20 after the pressure fluctuations of the measurement object gas are cancelled through the first diffusion rate controlling portion 11, the buffer space 12, and the second diffusion rate controlling portion 13. Accordingly, the pressure fluctuations of the measurement object gas introduced to the first inner cavity 20 are reduced to an almost negligible level. The first inner cavity 20 is provided as a space for adjusting the oxygen partial pressure in the measurement object gas having been introduced through the second diffusion rate controlling portion 13. The oxygen partial pressure is adjusted by operation of a main pump cell 21.

The main pump cell 21 is an electrochemical pump cell constituted by an inner pump electrode 22 including a ceiling electrode portion 22a that is formed over substantially an entire partial region of the lower surface of the second solid electrolyte layer 6, the partial region being positioned to face the first inner cavity 20, by an outer pump electrode 23 formed in a region of an upper surface of the second solid electrolyte layer 6 to be exposed to the external space, the region opposing to the ceiling electrode portion 22a, and by the second solid electrolyte layer 6 sandwiched between the above two pump electrodes.

The inner pump electrode 22 is formed by utilizing not only the upper and lower solid electrolyte layers (i.e., the second solid electrolyte layer 6 and the first solid electrolyte layer 4) which define the first inner cavity 20, but also the spacer layer 5 defining opposite sidewalls of the first inner cavity 20. More specifically, the ceiling electrode portion 22a is formed in a partial region of the lower surface of the second solid electrolyte layer 6, the partial region defining a ceiling surface of the first inner cavity 20, and a bottom electrode portion 22b is formed in a partial region of the upper surface of the first solid electrolyte layer 4, the partial region defining a bottom surface of the first inner cavity 20. Furthermore, side electrode portions (not illustrated) are formed in partial regions of sidewall surfaces (inner surfaces) of the spacer layer 5, the partial regions defining the opposite sidewalls of the first inner cavity 20, to connect the ceiling electrode portion 22a and the bottom electrode portion 22b. Thus, the inner pump electrode 22 is provided in a tunnel-like structure in a region where the side electrode portions are disposed.

The inner pump electrode 22 and the outer pump electrode 23 are each formed as a porous cermet electrode (e.g., a cermet electrode made of Pt and $ZrO_2$ and containing 1% of Au). It is to be noted that the inner pump electrode 22 contacting the measurement object gas is made of a material having a weakened reducing ability with respect to NOx components in the measurement object gas.

By applying a desired pump voltage Vp0 between the inner pump electrode 22 and the outer pump electrode 23 such that a pump current Ip0 flows in a positive direction or a negative direction between the inner pump electrode 22 and the outer pump electrode 23, the main pump cell 21 can pump out oxygen within the first inner cavity 20 to the external space or can pump oxygen in the external space into the first inner cavity 20.

Moreover, in order to detect the oxygen concentration (oxygen partial pressure) in an atmosphere within the first inner cavity 20, an electrochemical sensor cell, i.e., an oxygen-partial-pressure detection sensor cell 80 for main pump control, is constituted by the inner pump electrode 22, the second solid electrolyte layer 6, the spacer layer 5, the first solid electrolyte layer 4, the third substrate layer 3, and the reference electrode 42.

The oxygen concentration (oxygen partial pressure) within the first inner cavity 20 can be determined by measuring electromotive force V0 in the oxygen-partial-pressure detection sensor cell 80 for main pump control. In addition, the pump current Ip0 is controlled by performing feedback-control of the pump voltage Vp0 of a variable power supply 24 such that the electromotive force V0 is kept constant. As a result, the oxygen concentration within the first inner cavity 20 can be held at a predetermined constant value.

The third diffusion rate controlling portion 30 applies predetermined diffusion resistance to the measurement object gas of which oxygen concentration (oxygen partial pressure) has been controlled in the first inner cavity 20 by the operation of the main pump cell 21, and then introduces the measurement object gas to the second inner cavity 40.

The second inner cavity 40 is provided as a space in which a process of measuring a concentration of nitrogen oxides (NOx) in the measurement object gas having been introduced through the third diffusion rate controlling portion 30 is performed. In the second inner cavity 40 in which the oxygen concentration has been adjusted mainly by an auxiliary pump cell 50, the NOx concentration is measured by further operating a measurement pump cell 41.

In the second inner cavity 40, the oxygen partial pressure is further adjusted by the auxiliary pump cell 50 on the measurement object gas that is introduced to the second inner cavity 40 through the third diffusion rate controlling portion 30 after the oxygen concentration (oxygen partial pressure) has been previously adjusted in the first inner cavity 20. Accordingly, the oxygen concentration in the second inner cavity 40 can be kept constant with high accuracy. Hence highly-accurate measurement of the NOx concentration can be performed in the gas sensor 100.

The auxiliary pump cell 50 is an auxiliary electrochemical pump cell constituted by an auxiliary pump electrode 51 including a ceiling electrode portion 51a that is formed over substantially an entire partial region of the lower surface of the second solid electrolyte layer 6, the partial region being positioned to face the second inner cavity 40, by the outer pump electrode 23 (an appropriate electrode outside the sensor element 101 may also be used without being limited to the outer pump electrode 23), and by the second solid electrolyte layer 6.

The auxiliary pump electrode 51 is formed within the second inner cavity 40 in a tunnel-like structure similarly to the above-described inner pump electrode 22 formed in the first inner cavity 20. More specifically, the tunnel structure is constituted as follows. A ceiling electrode portion 51a is formed in a partial region of the second solid electrolyte layer 6, the partial region defining a ceiling surface of the second inner cavity 40, and a bottom electrode portion 51b is formed in a partial region of the first solid electrolyte layer 4, the partial region defining a bottom surface of the second inner cavity 40. Furthermore, side electrode portions (not illustrated) connecting the ceiling electrode portion 51a and the bottom electrode portion 51b are formed in partial regions of the sidewall surfaces of the spacer layer 5, the partial regions defining opposite sidewalls of the second inner cavity 40. As in the inner pump electrode 22, the auxiliary pump electrode 51 is also made of a material having a weakened reducing ability with respect to NOx components in the measurement object gas.

By applying a desired pump voltage Vp1 between the auxiliary pump electrode 51 and the outer pump electrode 23, the auxiliary pump cell 50 can pump out oxygen in an atmosphere within the second inner cavity 40 to the external space or can pump oxygen into the second inner cavity 40 from the external space.

Moreover, in order to control the oxygen partial pressure in the atmosphere within the second inner cavity 40, an electrochemical sensor cell, i.e., an oxygen-partial-pressure detection sensor cell 81 for auxiliary pump control, is constituted by the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping by using a variable power supply 52 of which voltage is controlled in accordance with electromotive force V1 that is detected by the oxygen-partial-pressure detection sensor cell 81 for auxiliary pump control. As a result, the oxygen partial pressure in the atmosphere within the second inner cavity 40 can be controlled to such a low partial pressure level as not substantially affecting the measurement of NOx.

In addition, a pump current Ip1 flowing in the auxiliary pump cell 50 is used to control the electromotive force V0 of the oxygen-partial-pressure detection sensor cell 80 for main pump control. More specifically, the pump current Ip1 is input as a control signal to the oxygen-partial-pressure detection sensor cell 80 for main pump control, and the electromotive force V0 is controlled such that a gradient of the oxygen partial pressure in the measurement object gas introduced to the second inner cavity 40 through the third diffusion rate controlling portion 30 is always kept constant. When the gas sensor is used as a NOx sensor, the oxygen concentration within the second inner cavity 40 is kept at a constant value of about 0.001 ppm by the action of the main pump cell 21 and the auxiliary pump cell 50.

The measurement pump cell 41 performs, within the second inner cavity 40, the measurement of the NOx concentration in the measurement object gas. The measurement pump cell 41 is an electrochemical pump cell constituted by a measurement electrode 44 that is formed in a partial region of the upper surface of the first solid electrolyte layer 4, the partial region being positioned to face the second inner cavity 40 at a location away from the third diffusion rate controlling portion 30, the outer pump electrode 23, the second solid electrolyte layer 6, the spacer layer 5, and the first solid electrolyte layer 4.

The measurement electrode 44 is a porous cermet electrode. The measurement electrode 44 functions also as a NOx reducing catalyst that reduces NOx present in the atmosphere within the second inner cavity 40. Furthermore, the measurement electrode 44 is covered with a fourth diffusion rate controlling portion 45.

The fourth diffusion rate controlling portion 45 is a film made of a ceramic porous body. The fourth diffusion rate controlling portion 45 not only takes a role of limiting an amount of NOx flowing into the measurement electrode 44, but also functions as a protective film for the measurement electrode 44. In the measurement pump cell 41, oxygen generated by decomposition of nitrogen oxides in an atmosphere around the measurement electrode 44 can be pumped out, and an amount of the generated oxygen can be detected as a pump current Ip2.

Moreover, in order to detect the oxygen partial pressure around the measurement electrode 44, an electrochemical sensor cell, i.e., an oxygen-partial-pressure detection sensor cell 82 for measurement pump control, is constituted by the first solid electrolyte layer 4, the third substrate layer 3, the measurement electrode 44, and the reference electrode 42. A variable power supply 46 is controlled in accordance with electromotive force V2 detected by the oxygen-partial-pressure detection sensor cell 82 for measurement pump control.

The measurement object gas introduced to the second inner cavity 40 reaches the measurement electrode 44 through the fourth diffusion rate controlling portion 45 under condition that the oxygen partial pressure is controlled. The nitrogen oxides in the measurement object gas around the measurement electrode 44 are reduced ($2NO \rightarrow N_2+O_2$), whereby oxygen is generated. The generated oxygen is pumped out by the measurement pump cell 41. On that occasion, a voltage Vp2 of the variable power supply 46 is controlled such that the control voltage V2 detected by the oxygen-partial-pressure detection sensor cell 82 for measurement pump control is kept constant. Because an amount of the oxygen generated around the measurement electrode 44 is proportional to a concentration of the nitrogen oxides in the measurement object gas, the concentration of the nitrogen oxides in the measurement object gas can be calculated from the pump current Ip2 in the measurement pump cell 41.

Moreover, by combining the measurement electrode 44, the first solid electrolyte layer 4, the third substrate layer 3, and the reference electrode 42 to constitute an oxygen partial pressure detection device in the form of an electrochemical sensor cell, it is also possible to detect electromotive force corresponding to a difference between an amount of the oxygen generated by reduction of the NOx components in the atmosphere around the measurement electrode 44 and an amount of oxygen contained in the atmosphere as a reference, and hence to determine the concentration of the NOx components in the measurement object gas from the detected electromotive force.

In addition, an electrochemical sensor cell 83 is constituted by the second solid electrolyte layer 6, the spacer layer 5, the first solid electrolyte layer 4, the third substrate layer 3, the outer pump electrode 23, and the reference electrode 42. The oxygen partial pressure in the measurement object gas outside the gas sensor can be detected from electromotive force Vref obtained by the electrochemical sensor cell 83.

In the gas sensor 100 having the above-described structure, the measurement object gas is applied to the measurement pump cell 41 under the condition that the oxygen partial pressure in the measurement object gas is always kept at such a constant low value (as not substantially affecting the measurement of NOx) by the operation of both the main pump cell 21 and the auxiliary pump cell 50. Accordingly, the NOx concentration in the measurement object gas can be determined in accordance with the pump current Ip2 that flows with pumping-out of oxygen by the measurement pump cell 41, the oxygen being generated due to reduction of NOx in almost proportion to the NOx concentration in the measurement object gas.

In order to increase the oxygen ion conductivity of the solid electrolyte, the sensor element 101 includes a heater section 70 that has a role of temperature adjustment by heating the sensor element 101 and holding the temperature thereof. The heater section 70 includes a heater connector electrode 71, a heater 72, a through-hole 73, a heater insulating layer 74, and a pressure release hole 75.

The heater connector electrode 71 is formed in contact with a lower surface of the first substrate layer 1. By connecting the heater connector electrode 71 to an external power supply 78 (see FIG. 4), electric power can be supplied to the heater 72 in the heater section 70 from the outside.

The heater 72 is an electric resistor formed in a state sandwiched between the second substrate layer 2 and the third substrate layer 3 from below and above, respectively. The heater 72 is connected to the heater connector electrode 71 via the through-hole 73, and it generates heat with supply of the electric power from the external power supply 78 (see FIG. 4) through the heater connector electrode 71, thus heating the solid electrolyte forming the sensor element 101 and holding the temperature thereof. The control device 90 measures the resistance of the heater 72 and converts the measured resistance to a heater temperature. The resistance of the heater 72 can be expressed as a linear function of the heater temperature.

The heater 72 is embedded over an entire region ranging from the first inner cavity 20 to the second inner cavity 40, and it can adjust the temperature in the entirety of the sensor element 101 to a level (e.g., 800 to 900° C.) at which the solid electrolyte is activated.

The heater insulating layer 74 is an insulating layer made of an insulator such as alumina and covering upper and lower surfaces of the heater 72. The heater insulating layer 74 is formed with intent to provide electrical insulation between the second substrate layer 2 and the heater 72 and electrical insulation between the third substrate layer 3 and the heater 72.

The pressure release hole 75 is formed to penetrate through the third substrate layer 3 and to communicate with the reference gas inlet space 43, aiming to relieve a rise of inner pressure caused by a temperature rise in the heater insulating layer 74.

As illustrated in FIGS. 2 and 3, the porous protective film 101b is disposed to extend rearward from a front end surface of the sensor element body 101a while covering the outer pump electrode 23. The gas inlet port 10 is covered with the porous protective film 101b, but the measurement object gas can flow through the inside of the porous protective film 101b and reach the gas inlet port 10. The porous protective film 101b has a role of suppressing the occurrence of cracking in the sensor element body 101a due to, for example, attachment of moisture in the measurement object gas. The porous protective film 101b further has a role of suppressing attachment of an oil component, etc., which are contained in the measurement object gas, to the outer pump electrode 23, and suppressing deterioration of the outer pump electrode 23. Preferably, the porous protective film 101b is a porous body and contains ceramic particles as constituent particles. More preferably, the porous protective film 101b contains particles of at least one among alumina, zirconia, spinel, cordierite, titania, and magnesia. In this embodiment, the porous protective film 101b is made of an alumina porous body. The porosity of the porous protective film 101b is, for example, 5% by volume to 40% by volume.

The control device 90 is a well-known microprocessor including a CPU 92, a memory 94, etc. as illustrated in FIG. 4. The control device 90 receives the electromotive force V0 detected by the oxygen-partial-pressure detection sensor cell 80 for main pump control, the electromotive force V1 detected by the oxygen-partial-pressure detection sensor cell 81 for auxiliary pump control, the electromotive force V2 detected by the oxygen-partial-pressure detection sensor cell 82 for measurement pump control, the current Ip0 detected by the main pump cell 21, the current Ip1 detected by the auxiliary pump cell 50, and the current Ip2 detected by the measurement pump cell 41. Furthermore, the control device 90 outputs control signals to the variable power supply 24 for the main pump cell 21, the variable power supply 52 for the auxiliary pump cell 50, and the variable power supply 46 for the measurement pump cell 41. Moreover, the control device 90 receives the resistance of the heater 72 for conversion to the heater temperature, and supplies the electric power to the heater 72 through the external power supply 78. The electric power supplied to the heater 72 from the external power supply 78 is controlled in accordance with a time during which a constant voltage is supplied. In other words, the supplied electric power is controlled in accordance with a duty ratio, i.e., a rate of an on-time in a predetermined period. Pulse width modulation (PWM) can be utilized to perform the above-described control.

The control device 90 feedback-controls the pump voltage Vp0 of the variable power supply 24 such that the electromotive force V0 is held at a target value. Accordingly, the pump current Ip0 changes depending on the concentration of the oxygen contained in the measurement object gas or an air-fuel ratio (A/F) of the measurement object gas. Hence the control device 90 can calculate the oxygen concentration or the A/F of the measurement object gas in accordance with the pump current Ip0.

The control device 90 feedback-controls the voltage Vp1 of the variable power supply 52 such that the electromotive force V1 is kept constant (namely, such that the oxygen concentration in the atmosphere within the second inner cavity 40 is held at a predetermined low oxygen concentration not substantially affecting the measurement of NOx). In addition, the control device 90 sets a target value of the electromotive force V0 on the basis of the pump current Ip1. As a result, the gradient of the oxygen partial pressure in the measurement object gas introduced to the second inner cavity 40 from the third diffusion rate controlling portion 30 is always kept constant.

The control device 90 feedback-controls the voltage Vp2 of the variable power supply 46 such that the electromotive force V2 is kept constant (namely, such that the concentration of the oxygen generated by reduction of the nitrogen oxides in the measurement object gas at the measurement electrode 44 becomes substantially zero), and calculates the concentration of the nitrogen oxides in the measurement object gas on the basis of the pump current Ip2.

Figure 5:
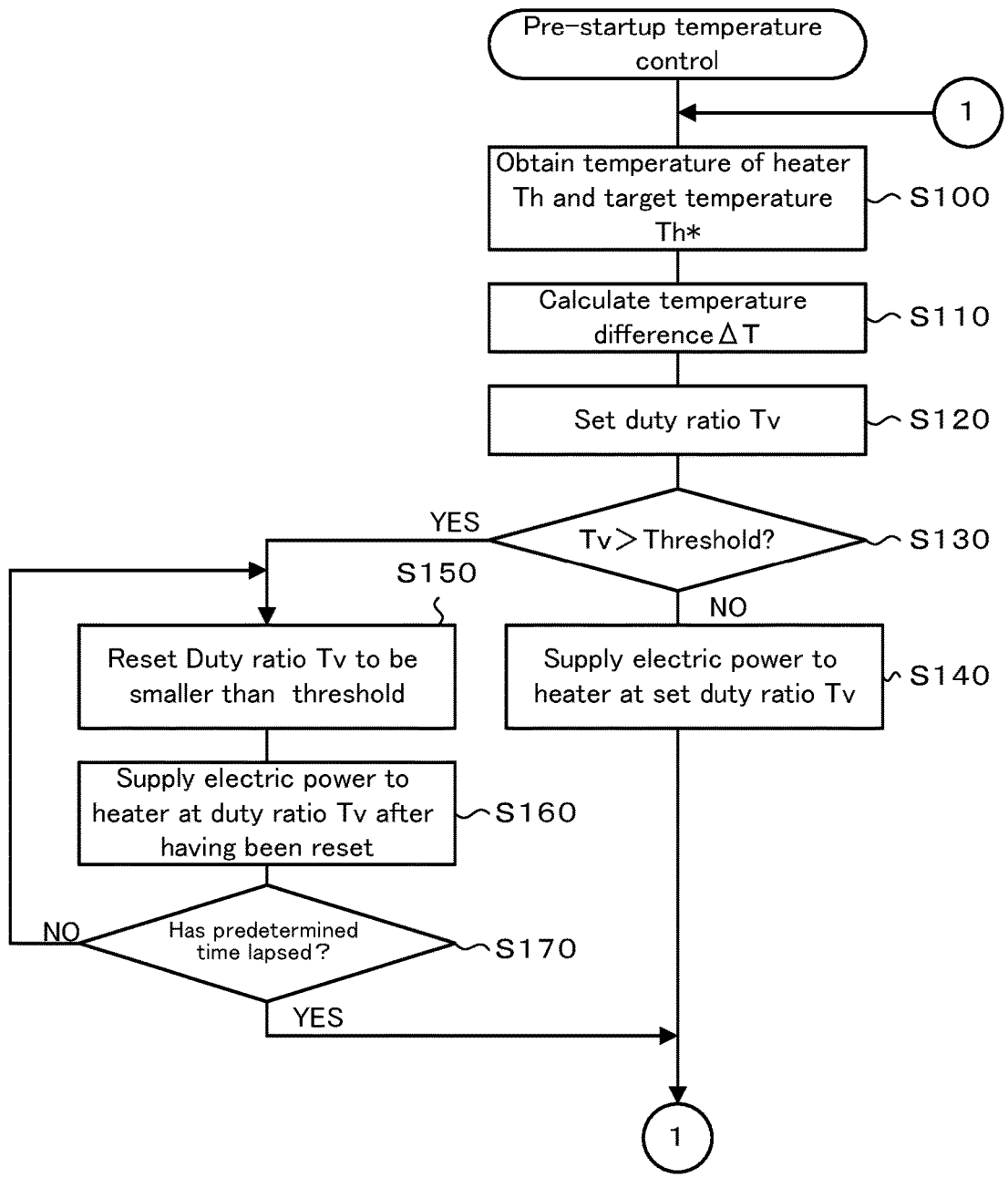
FIG. 5 is a flowchart illustrating an example of a pre-startup temperature control.

Prior to the startup of the gas sensor 100, the control device 90 executes pre-startup temperature control of heating the gas sensor 100 to a predetermined operating temperature (e.g., 800° C. or 850° C.). The pre-startup temperature control is described with reference to FIG. 5. FIG. 5 is a flowchart illustrating an example of the pre-startup temperature control.

Upon commence of the pre-startup temperature control, the CPU 92 of the control device 90 first calculates a current temperature Th of the heater 72 from the resistance of the heater 72, and obtains a target temperature Th* (this is assumed here to be the same as the operating temperature) of the heater 72, which is previously stored in the memory 94 (S100). Then, the CPU 92 calculates a temperature difference ΔT between the temperature Th and the target temperature Th* (S110). Then, the CPU 92 sets a duty ratio Tv such that the temperature difference ΔT becomes zero (S120). In other words, the CPU 92 executes feedback-control such that the temperature Th becomes equal to the target temperature Th*. The duty ratio Tv is a rate of a time during which a voltage is applied to the heater 72 in a certain period. The voltage application time is a time during which a predetermined voltage (constant) is continuously applied. Therefore, the duty ratio Tv can be regarded as electric power supplied to the heater 72. In S120, the duty ratio Tv is set to a larger value as the temperature difference ΔT increases, and to a smaller value as the temperature difference ΔT is closer to zero. Then, the CPU 92 determines whether the duty ratio Tv exceeds a predetermined threshold (S130). If the duty ratio Tv does not exceed the predetermined threshold, namely if the determination result in S130 is NO, the CPU 92 makes control to supply the electric power to the heater 72 from the external power supply 78 at the current duty ratio Tv (S140), and then returns to S100 again. On the other hand, if the duty ratio Tv exceeds the predetermined threshold in S130, namely if the determination result in S130 is YES, the CPU 92 resets the duty ratio Tv to be smaller than the threshold (S150), and makes control to supply the electric power to the heater 72 from the external power supply 78 at the duty ratio Tv after having been reset (S160). Thereafter, the CPU 92 determines whether a predetermined time has lapsed in the above state (S170). If the predetermined time has not yet lapsed, the CPU 92 returns to S150, and if the predetermined time has lapsed, the CPU 92 returns to S100. With the above-described process, the gas sensor 100 prior to the startup can be heated to the operating temperature as quickly as possible while ensuring that the duty ratio Tv remains in the range not exceeding the threshold.

Figure 6:
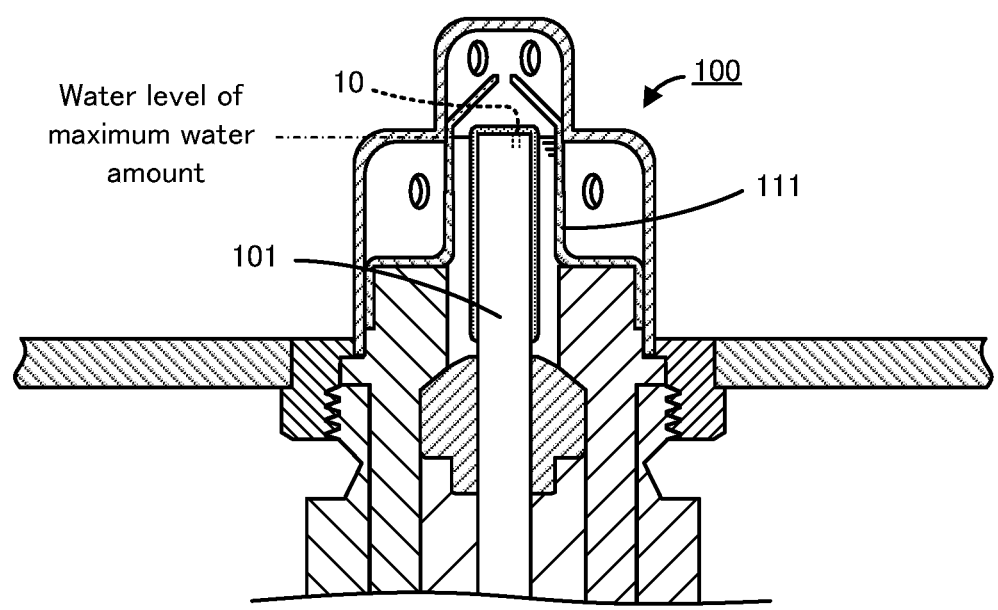
FIG. 6 is an explanatory view referenced to explain a maximum water amount for the gas sensor 100 in preliminary experiments.
Figure 7:
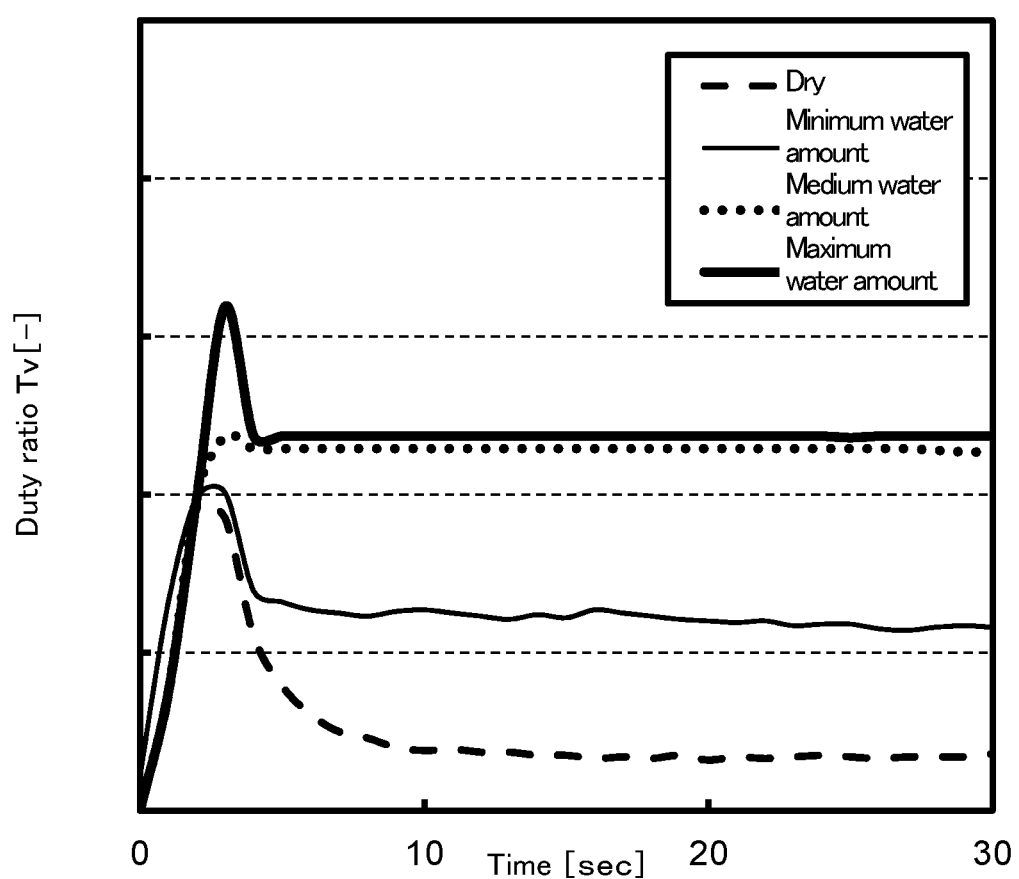
FIG. 7 is a graph representing a relation between a time and a duty ratio Tv in the preliminary experiments.

The predetermined threshold can be set by carrying out preliminary experiments in advance. An example of the preliminary experiments actually carried out will be described below. First, the gas sensor 100 of FIG. 1 was placed upside down, and water was put into the inside of the inner protective cover 111 in a state in which the holes in the tip portion of the inner protective cover 111 remained open while the holes in the side surface thereof were closed. A water amount was set in four levels, i.e., a maximum water amount, a medium water amount, a minimum water amount, and no water (dry). As illustrated in FIG. 6, the maximum water amount was defined as a water amount when a water level was positioned slightly lower than a tip surface of the sensor element 101 at which the gas inlet port 10 is opened. The medium water amount was defined as a half of the maximum water amount, and the minimum water amount was defined as a half of the medium water amount. Next, the gas sensor 100 at a room temperature was prepared, and sample gas having the previously-known NOx concentration was introduced to the gas flow portion in a dry state without adding water. Then, cracking determination as for whether any abnormal value due to the occurrence of cracking was found in the pump current Ip2 of the sensor element 101 was performed by setting the duty ratio Tv for each of predetermined timings so as to make the temperature difference ΔT between the current heater temperature Th and the target temperature Th* become zero, and by supplying the electric power to the heater 72 at the set duty ratio Tv. Subsequently, the cracking determination was performed in a similar manner in each state in which water of the minimum water amount, the medium water amount, or the maximum water amount was put into the inner protective cover 111. The results of the preliminary experiments are plotted in FIG. 7. FIG. 7 is a graph representing a relation between the lapsed time and the duty ratio Tv. The duty ratio maximized in FIG. 7 during a period of executing the cracking determination was defined as a maximum Tv value, and a Tv-value increase rate was determined from the following expression (1). In the expression (1), a reference value represents the maximum Tv value in the dry state. Table 1 lists the Tv-value increase rates and the results of the cracking determination. Taking into consideration that cracking did not occur in the dry state and at the minimum water amount, and that cracking occurred at the medium water amount and the maximum water amount, the Tv value provided at the Tv-value increase rate of 10% was defined as a threshold based on judgement that cracking may occur at the Tv-value increase rate in excess of 10%.

Tv-value increase rate=100×(maximum Tv value−reference value)/reference value (%)     (1)

TABLE 1

| | Tv-value increase rate[%] | Cracking determination |
|---|---|---|
| Dry | 0.0 | Not occurred |
| Minimum water amount | 5.2 | Not occurred |
| Medium water amount | 24.1 | Occurred |
| Maximum water amount | 67.0 | Occurred |

The correspondence relationship between constituent elements in this embodiment and constituent elements in the present invention is explained here. A laminated body having the six layers in this embodiment, i.e., the first substrate layer 1, the second substrate layer 2, the third substrate layer 3, the first solid electrolyte layer 4, the spacer layer 5, and the second solid electrolyte layer 6, correspond to a solid electrolyte body in the present invention. The heater 72 corresponds to a resistance heating element, and the portion ranging from the gas inlet port 10 to the second inner cavity 40 corresponds to a gas flow portion. The main pump cell 21, the measurement pump cell 41, the auxiliary pump cell 50, the oxygen-partial-pressure detection sensor cell 80 for main pump control, the oxygen-partial-pressure detection sensor cell 81 for auxiliary pump control, and the oxygen-partial-pressure detection sensor cell 82 for measurement pump control correspond to a particular gas detector. The control device 90 corresponds to a controller. The outer pump electrode 23 corresponds to an externally exposed electrode.

According to the above-described embodiment, prior to the startup of the gas sensor 100, the duty ratio Tv (corresponding to the electric power supplied to the heater 72) is set such that the temperature Th of the heater 72 becomes equal to the target temperature Th* of the heater 72 (S120), and whether to execute the temperature raising control of supplying the electric power to the heater 72 at the set duty ratio Tv (S140) is determined on the basis of the relevant duty ratio Tv (S130). Prior to the startup of the gas sensor 100, the duty ratio Tv increases at a higher water spraying amount in the gas sensor 100. Furthermore, a phenomenon of causing the cracking in the gas sensor 100 depends on the duty ratio Tv. Thus, by determining, on the basis of the set electric power prior to starting the supply of the electric power to the heater 72 at the set duty ratio Tv, whether the temperature raising control is to be executed, the gas sensor 100 can be heated to the operating temperature in a shorter time while ensuring that cracking does not occur in the gas sensor 100.

Furthermore, the control device 90 determines whether the duty ratio Tv exceeds the threshold corresponding to the water spraying amount at which cracking may occur in the gas sensor 100 (S130), and if the determination result is NO, it executes the temperature raising control (S140). Under the condition that the duty ratio Tv does not exceed the threshold, a possibility of the occurrence of cracking in the gas sensor 100 is small. Accordingly, if the determination result is NO, the temperature raising control is executed. As a result, the gas sensor 100 can be heated to the operating temperature in a shorter time while ensuring that cracking does not occur in the gas sensor 100.

Moreover, if the determination result in S130 is YES, the control device 90 resets the duty ratio Tv to a value within the range not exceeding the threshold, and supplies the electric power to the heater 72 at the duty ratio Tv having been reset (S150, S160). Stated in another way, if the set duty ratio Tv exceeds the threshold, there is a possibility that cracking may occur in the gas sensor 100 because the water spraying amount in the gas sensor 100 is too high. Accordingly, the electric power is supplied to the heater 72 after resetting the duty ratio Tv to a value within the range not exceeding the threshold. As a result, the gas sensor 100 can be heated to the operating temperature in a shorter time than the case of stopping the supply of the electric power to the heater 72 when the set duty ratio Tv exceeds the threshold.

In addition, after starting the supply of the electric power to the heater 72 at the reset duty ratio Tv in S160, the control device 90 waits for the lapse of a predetermined time (YES in S170). Then, the control device 90 executes S100 to S130 again and determines whether the temperature raising control (S140) is to be executed. Accordingly, the temperature raising control can be restarted in a timely fashion, and a time to reach the operating temperature can be further shortened.

Since the gas sensor 100 includes the porous protective film 101b covering the outer pump electrode 23 and the gas inlet port 10 of the sensor element 101, cracking is harder to occur even when the water spraying amount is relatively high. Accordingly, the above-mentioned threshold can be set to a relatively high value.

When setting the duty ratio Tv to make the temperature Th of the heater 72 equal to the target temperature Th*, the control device 90 sets the duty ratio Tv to a larger value as the temperature difference ΔT increases, and to a smaller value as the temperature difference ΔT is closer to zero. Accordingly, the duty ratio Tv can be properly set depending on the temperature of the gas sensor 100.

The present invention is not limited to the above-described embodiment, and can be carried out by various modes as long as they belong to the technical scope of the invention.

For example, when resetting the duty ratio Tv in S150 for the prestart temperature control in the above-described embodiment, the CPU 92 may reset the duty ratio Tv such that the temperature Th of the heater 72 is maintained at a predetermined lower temperature (e.g., ⅔ or ¾ of the target temperature Th*). In that case, the predetermined lower temperature is set to a temperature reachable when the electric power is supplied to the heater 72 at the duty ratio Tv within the range not exceeding the threshold. Such a modification can also provide similar advantageous effects to those obtained in the above-described embodiment. In the above case, whether the temperature of the heater 72 has reached the predetermined lower temperature may be determined in S170 instead of determining whether the predetermined time has lapsed.

While, in the above-described embodiment, the control device 90 controls the electric power supplied to the heater 72 in accordance with the duty ratio, the present invention is not limited to such an example. In another example, the electric power supplied to the heater 72 may be controlled in accordance with the voltage applied to the heater 72 or the current supplied to flow through the heater 72.

Figure 8:
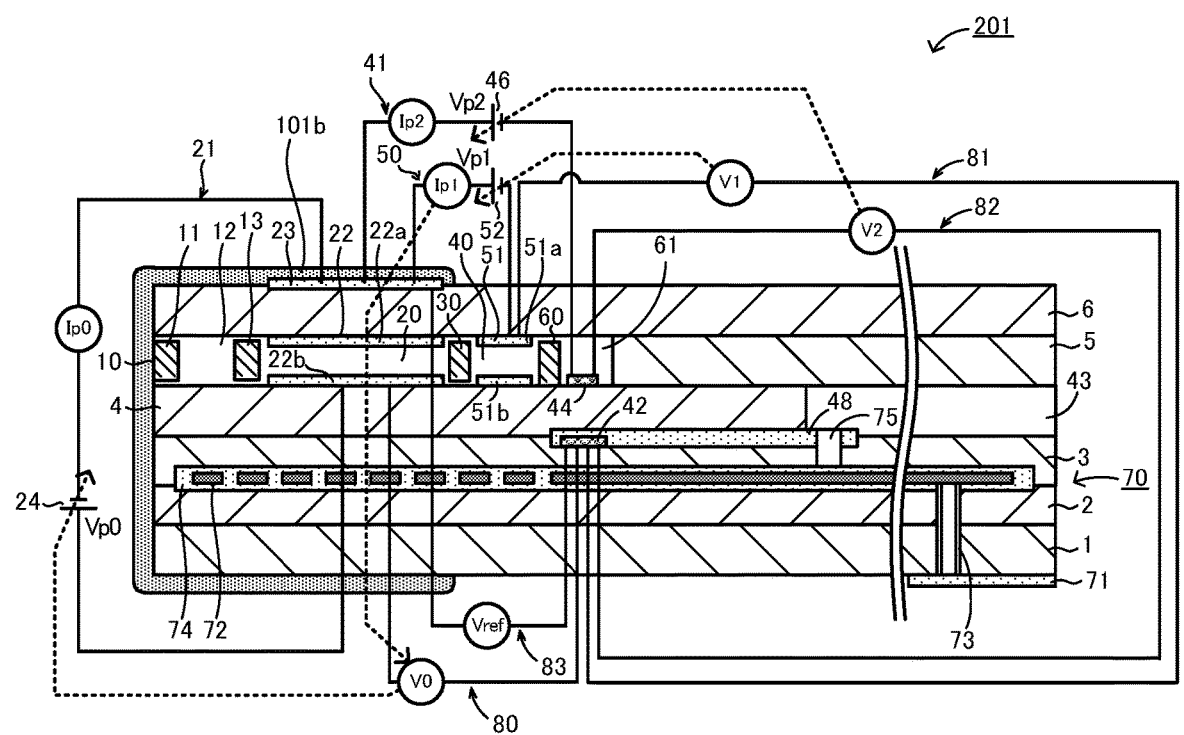
FIG. 8 is a sectional view of another sensor element 201.

While, in the above-described embodiment, the sensor element 101 of the gas sensor 100 includes, in the second inner cavity 40, the measurement electrode 44 covered with the fourth diffusion rate controlling portion 45, the present invention is not limited to such a structure. In another example, as illustrated in a sensor element 201 of FIG. 8, the measurement electrode 44 may be exposed without being covered, and a fourth diffusion rate controlling portion 60 in the form of a slit may be provided between the exposed measurement electrode 44 and the auxiliary pump electrode 51. The fourth diffusion rate controlling portion 60 applies predetermined diffusion resistance to the measurement object gas of which oxygen concentration (oxygen partial pressure) has been controlled in the second inner cavity 40 by the operation of the auxiliary pump cell 50, and then introduces the measurement object gas to a third inner cavity 61 on the innermost side. The fourth diffusion rate controlling portion 60 takes a role of limiting an amount of NOx flowing into the third inner cavity 61. The sensor element 201 having the above-described structure can also detect the NOx concentration by the measurement pump cell 41 as in the above-described embodiment. In FIG. 8, the same constituent elements as those in FIG. 1 are denoted by the same reference signs.

While the gas sensor 100 for detecting the NOx concentration has been described, by way of example, in the above embodiment, the present invention may be further applied to a gas sensor for detecting the concentration of oxygen or ammonia.

While, in the above-described embodiment, the control device 90 calculates the temperature of the heater 72 from the resistance of the heater 72 and hence the control device 90 serves also as a temperature detection unit for detecting the temperature of the heater 72, the present invention is not limited to such an example. In another example, a thermocouple measuring the temperature of the heater 72 may be used as the temperature detection unit. Alternatively, a detector may be used to measure the temperature at a predetermined position of the sensor element 101 and to calculate the temperature of the heater 72 from the measured temperature.

What is claimed is:

1. A method of operating a gas sensor, the gas sensor including: a solid electrolyte body with oxygen ion conductivity; a resistance heating element embedded in the solid electrolyte body; and a gas flow portion provided inside the solid electrolyte body, the method of operating the gas sensor comprising the steps of:
   detecting a particular gas in a measurement object gas introduced to the gas flow portion; and
   prior to startup of the gas sensor and prior to starting a supply of an electric power to the resistance heating element;
   setting electric power supplied to the resistance heating element such that a temperature of the resistance heating element becomes equal to a preset target temperature; and
   determining whether the set electric power exceeds a threshold corresponding to a water spraying amount at which cracking occurs in the gas sensor, and executing the temperature raising control if the set electric power does not exceed the threshold.

2. The method of operating the gas sensor according to claim 1, further comprising the step of:
   prior to startup of the gas sensor, supplying the electric power to the resistance heating element within a range not exceeding the threshold if the set electric power does exceed the threshold.

3. The method of operating the gas sensor according to claim 2, further comprising the steps of:
   at a predetermined timing after starting the supply of the electric power to the resistance heating element within the range not exceeding the threshold, again setting the electric power supplied to the resistance heating element such that the temperature of the resistance heating element becomes equal to the preset target temperature; and
   determining, on a basis of the again set electric power, whether the temperature raising control of supplying the again set electric power to the resistance heating element is to be executed.

4. The method of operating the gas sensor according to claim 3, wherein the gas sensor further comprises a porous protective film covering at least portions of the solid electrolyte body, the portions of the solid electrolyte body corresponding to an externally-exposed electrode of the gas sensor and an inlet of the gas flow portion.

5. The method of operating the gas sensor according to claim 2, wherein the gas sensor further comprises a porous protective film covering at least portions of the solid electrolyte body, the portions of the solid electrolyte body corresponding to an externally-exposed electrode of the gas sensor and an inlet of the gas flow portion.

6. The method of operating the gas sensor according to claim 1, wherein the gas sensor further comprises a porous protective film covering at least portions of the solid electrolyte body, the portions of the solid electrolyte body corresponding to an externally-exposed electrode of gas sensor and an inlet of the gas flow portion.

* * * * *